United States Patent [19]
Pattok et al.

[11] Patent Number: 6,050,360
[45] Date of Patent: Apr. 18, 2000

[54] APPARATUS AND METHOD FOR PRODUCING A DESIRED RETURN TORQUE IN A VEHICLE POWER STEERING SYSTEM HAVING A ROTATIONAL STEERING POSITION SENSOR

[75] Inventors: Kathryn Lynn Pattok, Saginaw; Deepak Chhaya, Canton; Ashok Chandy, Fenton, all of Mich.

[73] Assignee: General Motors Corporation, Detroit, Mich.

[21] Appl. No.: 09/103,603

[22] Filed: Jun. 24, 1998

[51] Int. Cl.$^7$ ........................................................ B62D 6/10
[52] U.S. Cl. ............................... 180/446; 180/443; 701/41
[58] Field of Search ...................................... 180/421, 422, 180/423, 443, 444, 446; 701/41, 42

[56] References Cited

U.S. PATENT DOCUMENTS

| | | | |
|---|---|---|---|
| 4,730,686 | 3/1988 | Shimizu | 701/41 |
| 4,825,972 | 5/1989 | Shimizu | 701/42 |
| 4,979,114 | 12/1990 | Oshita et al. | 701/41 |
| 5,065,323 | 11/1991 | Shiraishi et al. | 701/41 |
| 5,065,324 | 11/1991 | Oshita et al. | 701/41 |
| 5,283,740 | 2/1994 | Sato et al. | 180/446 |
| 5,422,810 | 6/1995 | Brunning et al. | 701/41 |
| 5,732,372 | 3/1998 | Mersden | 701/41 |
| 5,787,375 | 7/1998 | Madau et al. | 701/41 |
| 5,790,966 | 8/1998 | Madau et al. | 701/41 |
| 5,857,160 | 1/1999 | Dickinson et al. | 701/41 |

*Primary Examiner*—Brian L. Johnson
*Assistant Examiner*—Christopher Bottorff
*Attorney, Agent, or Firm*—Edmund P. Anderson

[57] ABSTRACT

A vehicle power steering system has a steering shaft with a rotational position sensor providing signal rollover so that each sensor output indicates a plurality of potential absolute steering positions separated from each other by multiples of a rollover angle. Upon each initiation of vehicle operation, the system selects, as an unadjusted steering position, one of the plurality of absolute steering positions corresponding to an initial sensor output; and the system repeatedly updates the unadjusted steering position in response to sensor output changes, including sensed rollover events. The system repeatedly tests a set of revolution offsets with the updated unadjusted steering position and excludes any which indicate an out-of-range absolute steering position. The final remaining revolution offset is latched as the correct value. Preferably, a temporary value of revolution offset used with the unadjusted position during the testing provides a return or centering torque of zero; and, once the final value is latched, the temporary value is walked incrementally toward the final value, when the return torque value is in the correct centering direction, to avoid a sudden increase in return torque or a return torque in the wrong direction. The walk ends when (1) the temporary value of revolution offset reaches the final value or (2) the true value of steering position, derived from the final value of revolution offset and the unadjusted position, reaches center, whichever occurs first. Thereafter, the final value of revolution offset is used with the updated unadjusted value to determine the absolute value, and thus return torque.

19 Claims, 10 Drawing Sheets

APPARATUS AND METHOD FOR PRODUCING A DESIRED RETURN TORQUE IN A VEHICLE POWER STEERING SYSTEM HAVING A ROTATIONAL STEERING POSITION SENSOR

TECHNICAL FIELD

The technical field of this invention is the determination of a desired return torque in a vehicle power steering system having a total range of steering position greater than the output range of a rotational position sensor.

BACKGROUND OF THE INVENTION

Some vehicle power steering systems use an actuator coupled to the steering shaft to provide power assist in vehicle steering. It is often desirable in such systems to provide a return torque command to the actuator so as to help return the steering gear to a centered position and provide a stable steering feel to the vehicle operator. Such a return torque command is generated as a function of steering position as shown in the graph of FIG. 4, provided the steering position is known. Rotational position sensors having high resolution and other desirable characteristics may be coupled to the steering shaft to provide an output voltage varying in a substantially linear manner from a first voltage to a second voltage through a rollover angle comprising an entire 360 degree rotation or some sub-multiple thereof. But the steering shaft typically rotates through a plurality of such revolutions or sub-multiple angles, and therefore a plurality of repetitions of the rollover angle, as the rack is moved from one end to the other of its operational range. Thus, a sensor directly coupled to the steering shaft for maximum resolution in the output signal is similarly rotated through a plurality of repetitions of the output voltage range and produces a rollover transition at the end of each repetition when the voltage jumps from one extreme to the other. The output of a sensor so coupled does not by itself provide a unique absolute steering position; rather, it provides a set of steering positions separated by a rollover angle corresponding to the full output voltage range. It is thus necessary, in order to know the absolute rotational position, to compensate the sensor output signal for such rollover transitions. But an offset parameter must also generally be generated every time a new vehicle ignition cycle is initiated, since the sensor may have been rotated into a different range of its output when the ignition was off, with no rollover transition being sensed.

When operation of a vehicle with such a steering system is initiated, it is not known for certain whether the steering position is right or left of center; and provision of return torque in the wrong direction could create just the opposite effect from that desired. It is therefor desirable to determine the steering system's absolute rotational position with some degree of confidence before applying full return torque. In addition, once the absolute steering position is known, it is preferable to phase in the return torque in a gradual, controlled manner that is not objectionable to the vehicle operator.

SUMMARY OF THE INVENTION

The method and apparatus of this invention determines an absolute steering position and return torque for a vehicle power steering system having a steering shaft with a rotational position sensor providing signal rollover so that each sensor output indicates a plurality of potential absolute steering positions separated from each other by multiples of a rollover angle.

The method is performed by the apparatus upon each initiation of vehicle operation and begins by selecting, as an unadjusted steering position, one of the plurality of steering positions corresponding to an initial sensor output. This unadjusted steering position is repeatedly updated in response to output changes of the rotational position sensor, including sensed rollover transitions, so that it spans the full range of steering position, although it may be incorrect by a revolution offset which is an integer multiple of the rollover angle. The updated value is repeatedly tested against a predetermined set of revolution offsets to determine which of these offsets, in combination with the updated value, produces a steering position outside the known total range of steering position. Any such revolution offset of the predetermined set found to be impossible is excluded; and, when only one is left, it is latched as the final revolution offset. After this occurs, absolute steering position is derived from this final revolution offset in combination with the unadjusted steering position.

The vehicle power steering system has an actuator coupled to the steering shaft for the provision of a return torque. During the testing period, while at least two revolution offsets remain unexcluded, a first return torque command is provided to the actuator to produce a predetermined first return torque. The first return torque command is preferably derived from a temporary revolution offset in combination with the updated unadjusted steering position; and in a preferred embodiment, the temporary revolution offset is preferably first given a value which, in combination with the updated unadjusted steering position, provides a return torque of zero. After only one final revolution offset remains unexcluded, an absolute steering position is derived from the one final revolution offset in combination with the unadjusted steering position; and a second return torque command is derived from the absolute steering position, and provided to the actuator to produce a second return torque.

To avoid a sudden increase in return torque when the one final revolution offset is found, the temporary revolution offset is preferably walked incrementally toward the one final revolution offset, with return torque derived from the temporary revolution offset so changed in combination with the updated unadjusted steering position as long as the derived return torque is in the correct centering direction, until either (1) the temporary revolution offset arrives within a first predetermined small distance of the one final revolution offset, or (2) when a true absolute steering position, derived from the one remaining revolution offset in combination with the updated unadjusted position, arrives within a second predetermined small distance of the center position, whichever occurs first. Preferably, thereafter, the absolute steering position and return torque are derived from the final revolution offset in combination with the unadjusted steering position.

In an optional addition, a usable revolution offset may be set as a target before the one final revolution offset is identified and the temporary revolution offset may be walked incrementally toward the usable revolution offset, with return torque derived from the temporary revolution offset so changed in combination with the updated unadjusted steering position as long as the derived return torque is in the correct centering direction.

DESCRIPTION OF THE PREFERRED EMBODIMENT

Figure 1:
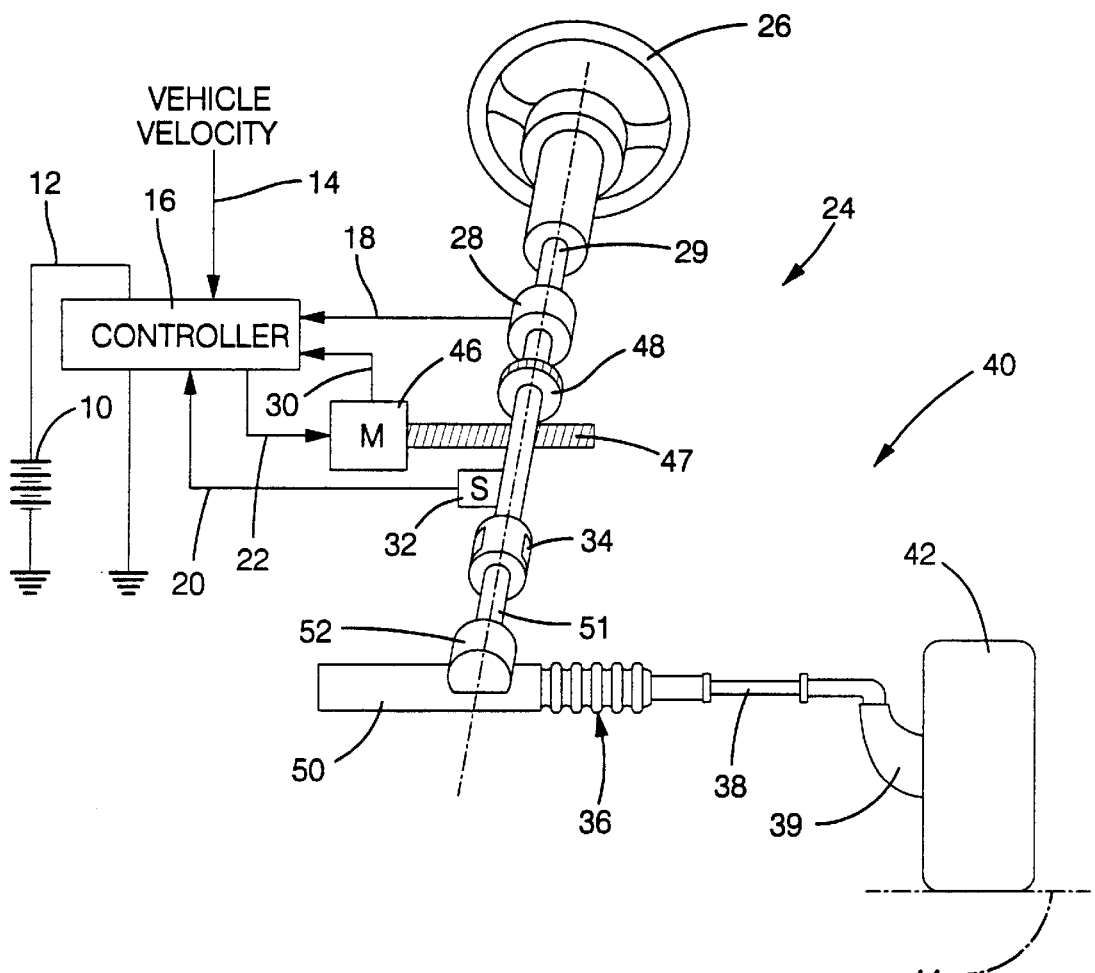
FIG. 1 shows a vehicle power steering system which provides an environment for the apparatus of this invention.

Referring to FIG. 1, a motor vehicle 40 is provided with a power steering system 24, which in this embodiment is an electric power steering system. Power steering system 24 may comprise a conventional rack and pinion steering mechanism 36, which includes a toothed rack 50 and a pinion gear (not shown) under gear housing 52. As a hand wheel 26 is turned by a vehicle operator, an upper steering shaft 29 turns a lower shaft 51 through a universal joint 34; and lower steering shaft 51 turns the pinion gear. Rotation of the pinion gear moves the rack, which moves the tie rods 38 (only one shown), which move steering knuckles 39 (only one shown) to turn steering wheels 42 (only one shown).

Power assist is provided through a controller 16 and a power assist actuator comprising an electric motor 46. Controller 16 receives electric power from a vehicle electric power source 10 through a line 12, a signal representative of the vehicle velocity on line 14, and steering pinion gear angle signal from a rotational position sensor 32 on line 20. As hand wheel 26 is turned, a torque sensor 28 senses the torque applied to hand wheel 26 by the vehicle operator and provides a handwheel torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor currents and provides such currents through a bus 22 to motor 46, which supplies torque assist to steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

Rack 50 and its associated pinion gear of steering system 24 have a center position, in which steering wheels 42 are directed straight ahead relative to vehicle 40. It is an object of power steering system 24 to provide a return torque that assists in returning the steering system to a center position from either side thereof and provides the vehicle operator with a stable steering response and feel. In power steering system 24, this return torque is generated by electric motor 46; and a return torque component of the total desired torque signal is generated in controller 16. The desired return torque is typically programmed into control 16 as a function of the absolute steering position: that is, the deviation in both directions from center of rack 50 and the pinion gear. Thus, an accurate signal of steering position must be derived from rotational position sensor 32.

Sensor 32 is preferably a rotational position sensor which provides an output voltage corresponding to rotational angle through a complete revolution of lower steering shaft 51, and thus of the pinion gear. For purposes of this description, it will be assumed that lower steering shaft 51, the rotating portion of sensor 32 and the pinion gear rotate together, as a unit, through the same rotational angle, to control the direction of steering wheels 42. But it is typical in vehicle steering systems that full rack movement of the steering system 24 may require three to five full turns of steering shaft 51 and the pinion gear, and thus of the rotatable portion of sensor 32. In this embodiment, sensor 32 is thus set up to provide a unique, continuously varying voltage between rotational positions 180 degrees to the left and right of the center position, at which point the voltage jumps or "rolls over" to repeat the variation with further rotation in the same direction. In other embodiments, sensor 32 may be set up to provide the unique, continuously varying voltage over only half (180 degrees) or some other fraction of one full rotation, thus producing an even greater number of rollover events over the full range of rack movement. Thus, the output signal of sensor 32 by itself is ambiguous in that a given output voltage may correspond to a plurality of rack or steering positions, only one of which is correct.

Figure 2:
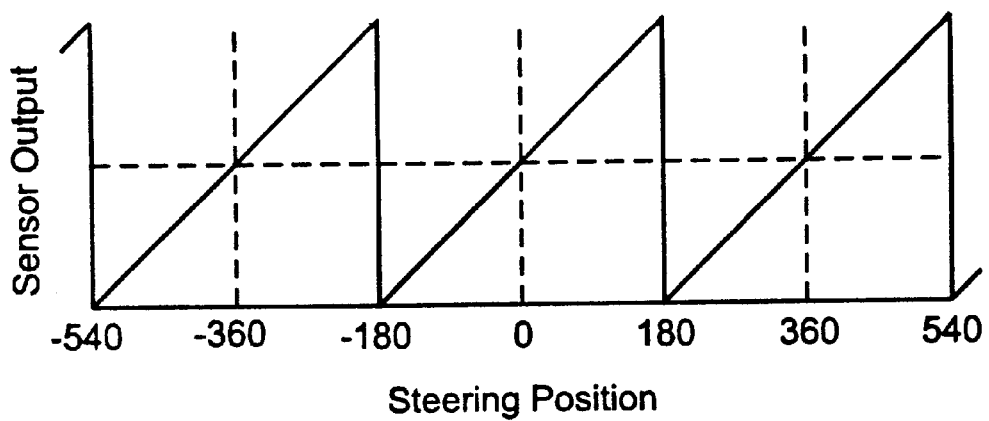
FIG. 2 is a graphical representation of the output signal of a rotational position sensor with a rollover output signal used as a steering angle sensor in the power steering system of FIG. 1.

In order to express the full range of steering angles as the output of sensor 32 changes, the apparatus of this invention performs an algorithm in controller 16, which may be embodied in a programmed digital computer or a custom digital processor. The algorithm is described with reference to the flow charts of FIGS. 5–7, together with the graphs of FIGS. 2, 3 and 5.

Figure 3:
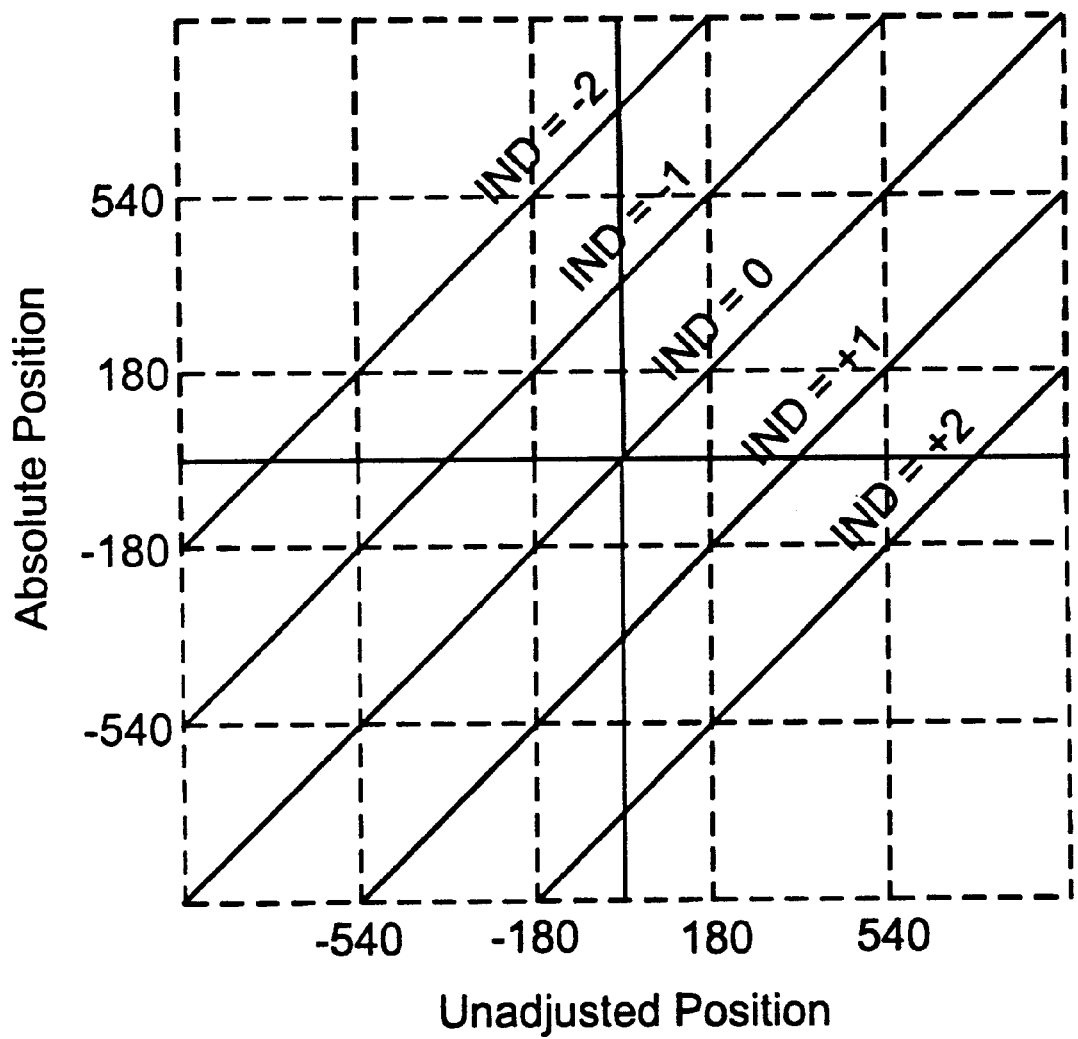
FIG. 3 shows a graphical representation of the output signal of FIG. 3 with rollover compensation applied.
Figure 5:
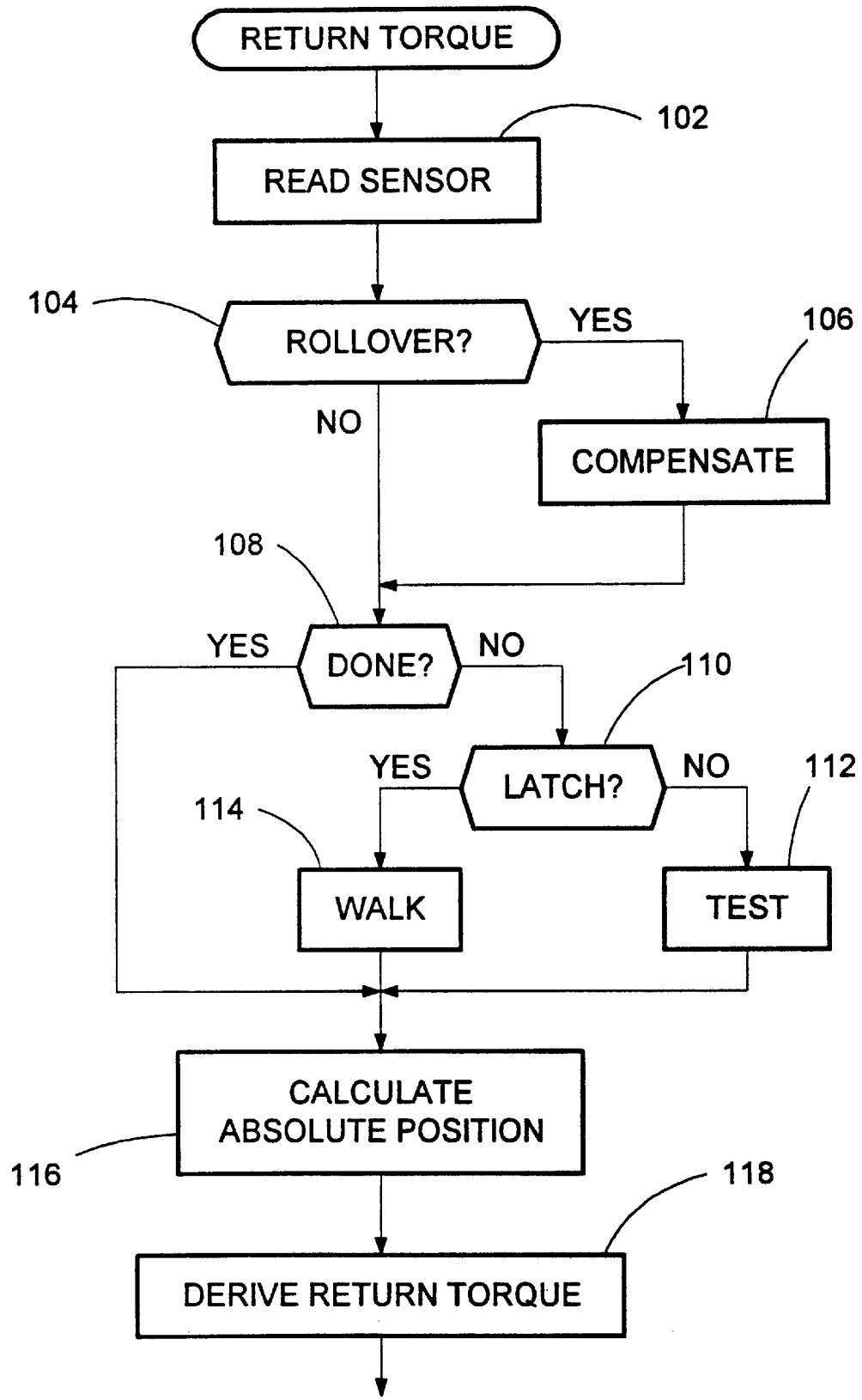
FIG. 5 shows a flow chart of a routine RETURN TORQUE comprising part of an embodiment of the method and apparatus of this invention.

Referring to FIG. 5, routine RETURN TORQUE begins by reading and storing the sensor output at 102. The sensor output is a voltage, which is converted into a digital word by A/D converter apparatus in controller 16. This digital word represents an angle as shown in FIG. 3, which shows a graphical representation of the output of sensor 32 over the full range of absolute steering position. The graph is horizontally divided into several sections of linearly increasing (from left to right) output over 360 rotational degrees, with the voltage output jumping between the highest and lowest values in a rollover transition between each two adjacent sections. The total rotational angle through which sensor 32 varies continuously before rolling over—360 degrees in this embodiment—is referred to herein as the rollover angle. The center section of the graph is itself centered on zero degrees, so that it spans the range $-180<\theta<+180$ degrees. For the initial sensor output reading, it is assumed that the value is on this center section of the graph.

Returning to FIG. 5, the sensor output is tested for rollover at 104; and, if required, rollover compensation is performed at 106. A rollover transition can be detected by comparing the present sensor output with a previous sensor output to detect when the value jumps between the extremes of its range. Rollover compensation provides a step increase of +360 degrees, in this embodiment, when an increasing sensor output rolls over from +180 to −180 degrees (corresponding to a rollover transition from its maximum voltage to its minimum voltage) and a similar but opposite step increase of −360 degrees when a decreasing sensor output rolls over from −180 to +180 degrees. An additional rollover transition in the same direction provides an additional 360 degree rollover compensating step change. The result is a full scale output as shown in the center line 90 of FIG. 3. But this adoption of the center line 90 of FIG. 3 is only assumed for testing purposes; the true full scale output might be this or any one of some additional lines, all of which are parallel and each of which is separated from the nearest others by the rollover angle of 360 degrees. In this embodiment, additional lines 91 and 92 are shown 360 degrees and 720 degrees, respectively, to the left of line 90; and lines 93 and 94 are shown 360 degrees and 720 degrees, respectively, to the right of line 90. Additional lines are also possible, particularly if the rollover angle of steering position sensor 23 is a sub-multiple of 360 degrees. Thus, the assumed value on the center line is referred to herein as the Unadjusted Position; and the true, Absolute Position is given by the following equation:

Absolute Position=Unadjusted Position−Revolution Offset.

The true value of Revolution Offset is zero or some multiple of the rollover angle—360 degrees in this embodiment—and may be expressed in terms of a Revolution Index (e.g., +2, +1, 0, −1, −2) times the rollover angle. It should be emphasized that the Revolution Offset is not rollover compensation, which changes with every rollover of the sensor output signal. Rather, it relates the line of the true Absolute Position in the graph of FIG. 3 to the Unadjusted Position of center line 90 over the full range of rack movement and, when determined with certainty and phased in, will not change for the remainder of the ignition cycle.

Once the Unadjusted Position is determined at 104 or 106, a DONE flag is checked at 108 to see if the final Revolution Offset is to be used in the equation for Absolute Position. This will be the case only when the final (presumed true) value of Revolution Offset has been determined and fully phased in; and this process typically requires many cycles of the program. The DONE flag is thus initialized in a not set condition and will typically remain so for many cycles of the program.

If the DONE flag is found not set at 108, a LATCH flag is checked at 110. The LATCH flag will be set only after the final value of Revolution Offset has been determined; and this flag also will be initialized as not set and likely remain so for a number of program cycles thereafter. Assuming the LATCH flag is not set, the program runs a subroutine TEST at step 112. In this subroutine certain tests are performed to advance the determination of the final value of Revolution Offset and a temporary value of Revolution Offset is provided. Subroutine TEST will be described at a later point in this description.

When the program has returned from subroutine TEST, it calculates the Absolute Position at step 116 according to the following equation:

Absolute Position=Unadjusted Position−Revolution Offset.

Once the Absolute Position is determined, a return torque may be derived therefrom at step 118:

Return Torque=f(Absolute Position).

Figure 4:
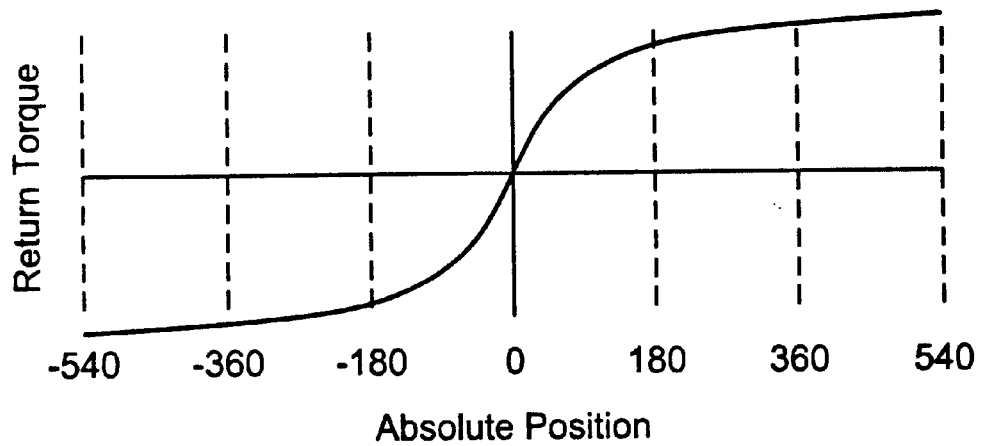
FIG. 4 is a graph of return torque as a function of absolute steering position in the power steering system of FIG. 1.

This function may be embodied in a look-up table containing values satisfying the relationship described in the curve of FIG. 4. Return torque is zero at Absolute Position=0 (center position) and increases in a return direction with movement away from that position. This return torque can be added to any other desired torque components into a total commanded torque signal in controller 16. It is also possible that return torque in one direction will be inhibited under some conditions, as will be explained later in this description.

Subroutine TEST is described in detail with reference to the flow chart of FIG. 6. The subroutine first performs a series of tests referred to as TEST AND EXCLUDE at step 120 in which a predetermined number of potential values of Revolution Offset are tested for possibility in view of the value of Unadjusted Position and the maximum travel of rack 50 from its center position. Assuming potential Revolution Offset Indexes of 0, +1, −1, +2 and −2, a flag for each is set during initialization and, as each is found to be impossible, its flag is reset. The tests are demonstrated below. A Revolution Offset of 0 is impossible and thus eliminated if either of the following expressions is true:

Unadjusted Position>(+Max Travel), or

Unadjusted Position<(−Max Travel),

Wherein Max Travel is the absolute value of the rotational equivalent of maximum rack travel from the center position, with a small tolerance adjustment.

A Revolution Offset of +1 is impossible and thus eliminated if either of the following is true:

Unadjusted Position<(+360−Max Travel), or

Unadjusted Position>(+360+Max Travel).

Likewise, a Revolution Offset of −1 is impossible and thus eliminated if either of the following is true:

Unadjusted Position>(−360+Max Travel), or

Unadjusted Position<(−360−Max Travel).

In a similar manner, a Revolution Offset of +2 is impossible and eliminated if either of the following is true:

Unadjusted Position<(+720−Max Travel), or

Unadjusted Position>(+720+Max Travel);

and a Revolution Offset of −2 is impossible and thus eliminated if either of the following is true:

Unadjusted Position>(−720+Max Travel), or

Unadjusted Position<(−720−Max Travel).

When only one Revolution Offset Index is left, that one must be correct. Therefore, after performing the tests, the subroutine next examines the Index flags at step 122 to determine if only one remains set. If there are two or more, the true Revolution Offset has not yet been determined; and a temporary value is given to Revolution Offset at step 124. In this embodiment, the Revolution Offset is made equal to the Unadjusted Position. Thus, when the program next returns from subroutine TEST and calculates Absolute Position, its value will be zero, regardless of the sensor output. This is a convenient way of preventing the provision of Return Torque, since it "fools" the torque determining part of the algorithm into considering the steering wheels 42 to be centered. However, if other information is available which, in the opinion of the system designer, will provide a usable temporary return torque value, it could be introduced in step 124 instead.

If the tests have left only one Revolution Offset Index remaining, that Index is latched at step 126 of subroutine TEST and subroutine TEST is exited. On the next cycle of routine RETURN TORQUE, a check of the LATCH flag at step 110 indicates that the flag is set. The true Revolution Offset has now been determined and can be used. However, if controller 16 suddenly changes the Revolution Offset, the Return Torque may undergo a sudden change which the vehicle operator will feel through the handwheel. Even if the initial assumption of the sensor output being on line 90 of FIG. 7 was correct, the correct corresponding Revolution Offset of zero is most probably not the value in use at the time of the determination. In this embodiment, at the time of the latching of the true Revolution Offset Index, the value of Revolution Offset has not been zero but, as described above, has been set equal to Unadjusted Position to produce zero Return Torque. Thus, the desired Return Torque is preferably phased in slowly and smoothly. This is accomplished by a subroutine WALK, which is called at step 114 before Absolute Position is calculated at 116.

Figure 7:
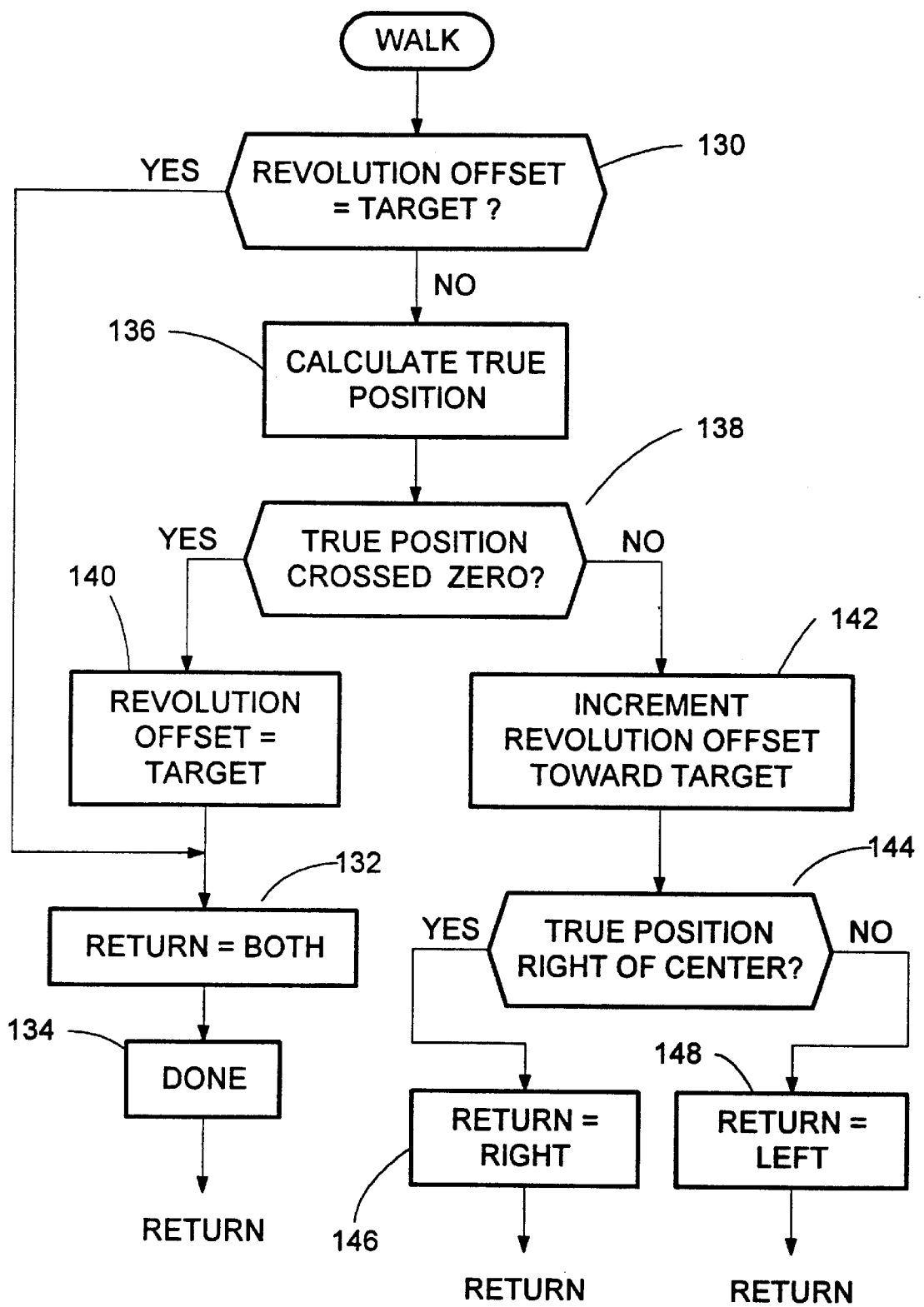
FIG. 7 shows a flow chart of a subroutine WALK comprising part of an embodiment of the method and apparatus of this invention.

Subroutine WALK is described by the flow chart of FIG. 7. The subroutine essentially "walks" the value of Revolution Offset in incremental steps from the value being used at the time a usable or new value of Revolution Offset Index is derived toward the target value corresponding to the derived Revolution Offset Index until the first of the following to occur: (1) the target value of Revolution Offset is reached, or (2) a true center position is reached. During this "walk," a Return Torque is derived based on the Absolute Position calculated from the walking value of Revolution Offset; but it is used only if it would actually provide a Return Torque in the direction of the center position.

Figure 8:
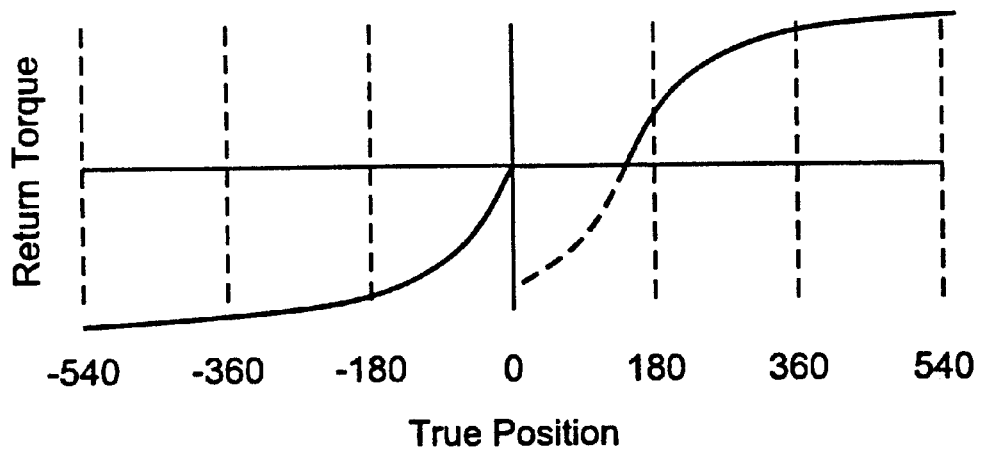
FIG. 8 shows a graphical representation of desired return torque as a function of true position useful in illustrating an example of the operation of the method and apparatus of this invention.

This may be demonstrated with reference to FIG. 8, in which solid line 160a–160c shows the desired return torque as a function of True Position for a specific example in which a last remaining Revolution Index of zero is latched at a time when the Unadjusted Position is +144 degrees and the Revolution Offset is thus also +144 degrees. The True Position is the value of Absolute Position corresponding to the targeted Revolution Offset: a value associated with the present usable value of Index. The word "true" is used in comparison with the Absolute Position, which is derived during the walk to provide an intended steering "feel" and does not actually represent a true steering position until the walk has ended.

It is not desirable to immediately replace the Revolution Offset value of +144 degrees with the target value of zero, since this would produce a sudden jump in Return Torque. Left portion 160a of line 160a–160c shows a normal Return Torque from the left. Right portion 160c shows the Return Torque from the right, starting with zero at the present True Position of +144 degrees. Center portion 160b is a straight horizontal line at zero torque between a True Position of zero and the present True Position of +144 degrees. The action of subroutine WALK is to incrementally move right portion 160c toward center, thus incrementally shortening center portion 160b, until the latter disappears and right portion 160c meets left portion 160 at a True Position of zero. This would represent the first condition for the end of the walk as stated above.

It must be kept in mind that the walk, and thus the movement of right portion 160c to the left, proceeds slowly and steadily under software control; but the steering system, and thus the Absolute Position, may be moved independently by the vehicle driver in either direction and over a wide range of speeds while the walk is taking place. The vehicle driver may, for example, move the steering system to the left at a faster rate than that of the walk. If so, the Unadjusted Position will become less than the Revolution Offset, and the Absolute Position determined at step 116 of FIG. 5 will become negative. The Return Torque derived in step 118 of FIG. 5 will also become negative and thus directed toward the right. This is demonstrated in the dashed line extension 160d of line 160c to the left into the negative torque region below the horizontal axis. The torque thus called for would be in the wrong direction; and, as will be described, subroutine WALK prevents such Return Torque from being applied, as indicated by the solid horizontal center portion 160b at zero Return Torque.

But if the fast movement of the steering system to the left continues, it may reach center (zero degrees) before Revolution Offset (and thus the left end of solid left portion 160c). In this case, or in the case where the steering system is returned to center from the left, the Return Torque will be zero—precisely what it should be at center. There is no reason why the walk should not be cut short and the target value IND*360 of Revolution Offset immediately substituted for the temporary value being used at the time, since no sudden change in Return Torque will occur. This is the second condition for ending the walk as stated above. Since driving maneuvers generally end with the driver straightening the handwheel, even a slowly calibrated walk can be quickly ended with this criteria.

Referring to FIG. 7, subroutine WALK begins with the present value of Revolution Offset being compared in step 130 with the target value, which is the product of the present usable Index and the rollover angle, in this embodiment 360 degrees:

Target Revolution Offset=Usable Index*360.

If the values are equal, the target value has been reached, and the walking is finished: this is the first test for the end of the walk as described above. Return Torque is authorized in both directions at step 132, since there is now no region in which the derived Return Torque may be in the wrong direction (center portion 160b in FIG. 8 has shrunk to nothing). The DONE flag is set at step 134, and the program returns from subroutine WALK, calculates the Absolute Position at step 116 and derives the corresponding Return Torque at step 118 of FIG. 5. On all subsequent cycles of the RETURN TORQUE routine until the vehicle ignition is turned off (or until an error is detected by optional apparatus not described herein), the DONE flag consulted at step 108 will cause subroutines TEST and WALK to be skipped. However, this is unlikely to occur in the first cycles of the routine.

If the present value of Revolution Offset has not reached the target value at step 130, the True Position is calculated at step 136. The True Position is the value of Absolute Position corresponding to the target value of Revolution Offset, derived from the usable Index, with the walk finished:

True Position=Unadjusted Position−Target Offset.

The value of True Position is examined at step 138; and, if it is zero, or if it has changed sign signifying that it has crossed zero, the second condition for the end of the walk has been met. It is preferred in this test for the end of walk to check both for True Position=zero and for True Position having crossed zero, since the motion of the steering system under vehicle driver control is unpredictable and potentially fast, so that a position of zero may be skipped between two sensor readings. This is in contrast to the first test for the end of walk, in which the incremental changes in Revolution Offset during the walk are completely under software control and may be forced to equal zero precisely when it is reached. In some embodiments, however, either or both tests may be expressed as whether the value being tested is within a predetermined distance of zero, since a small sudden change in Return Torque produced by a non-zero Absolute Position within the predetermined range about zero may be essentially negligible.

If True Position is found at 138 to have reached or crossed zero, the walk is ended with Revolution Offset being set equal to the Target at 140, Return Torque being authorized from both directions at 132 and the DONE flag set at 134 as previously described, with the DONE flag preventing further repetitions of the TEST or WALK subroutines.

But if True Position has not reached or crossed zero, the walk continues as the value of Revolution Offset is incremented toward the target value at 142. The sign of True Position is checked to see if it is to the right of center at 144. If it is, Return Torque from the right only is authorized at 146; and negative values such as those indicated in dashed line 160*d* of FIG. 8 will not be provided. If not, Return Torque from the left only is authorized at 148. Thus, the range of Return Torque indicated by line 160*a*–160*c* will be provided to motor 46 during the walk. Subroutine WALK is then exited; and Absolute Position is calculated at 116 of FIG. 5 using the incremented value of Revolution Offset. The WALK subroutine will continue to be called from routine RETURN TORQUE, with Return Torque provided or not as described above, until one of the conditions for the end of the walk is met and the DONE flag set, after which no further testing or walking is done for the remainder of the ignition cycle.

Figure 11A:
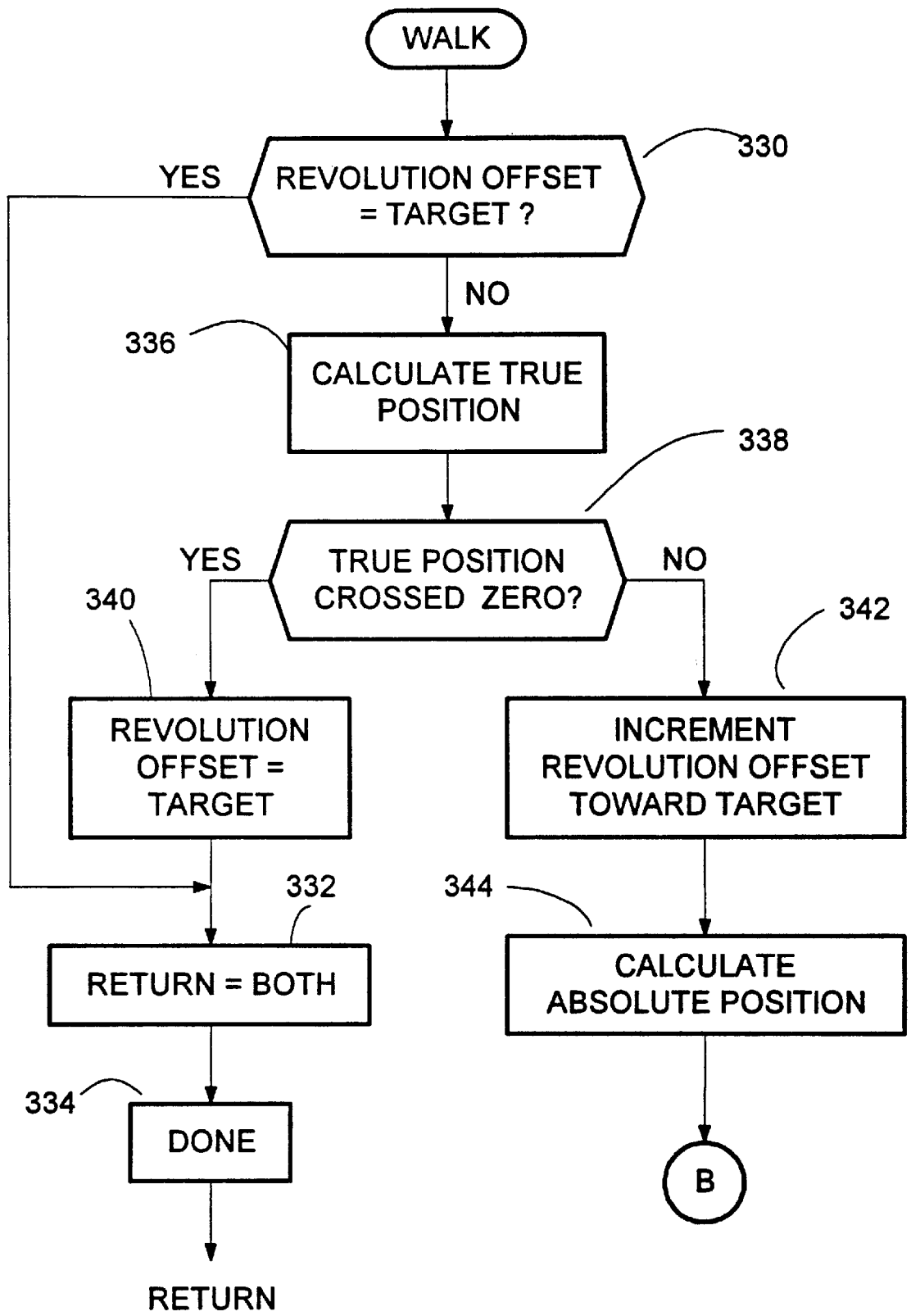
FIGS. 11A–11B show a flow chart of a variation of subroutine WALK comprising part of another embodiment of the method and apparatus of this invention.
Figure 11B:
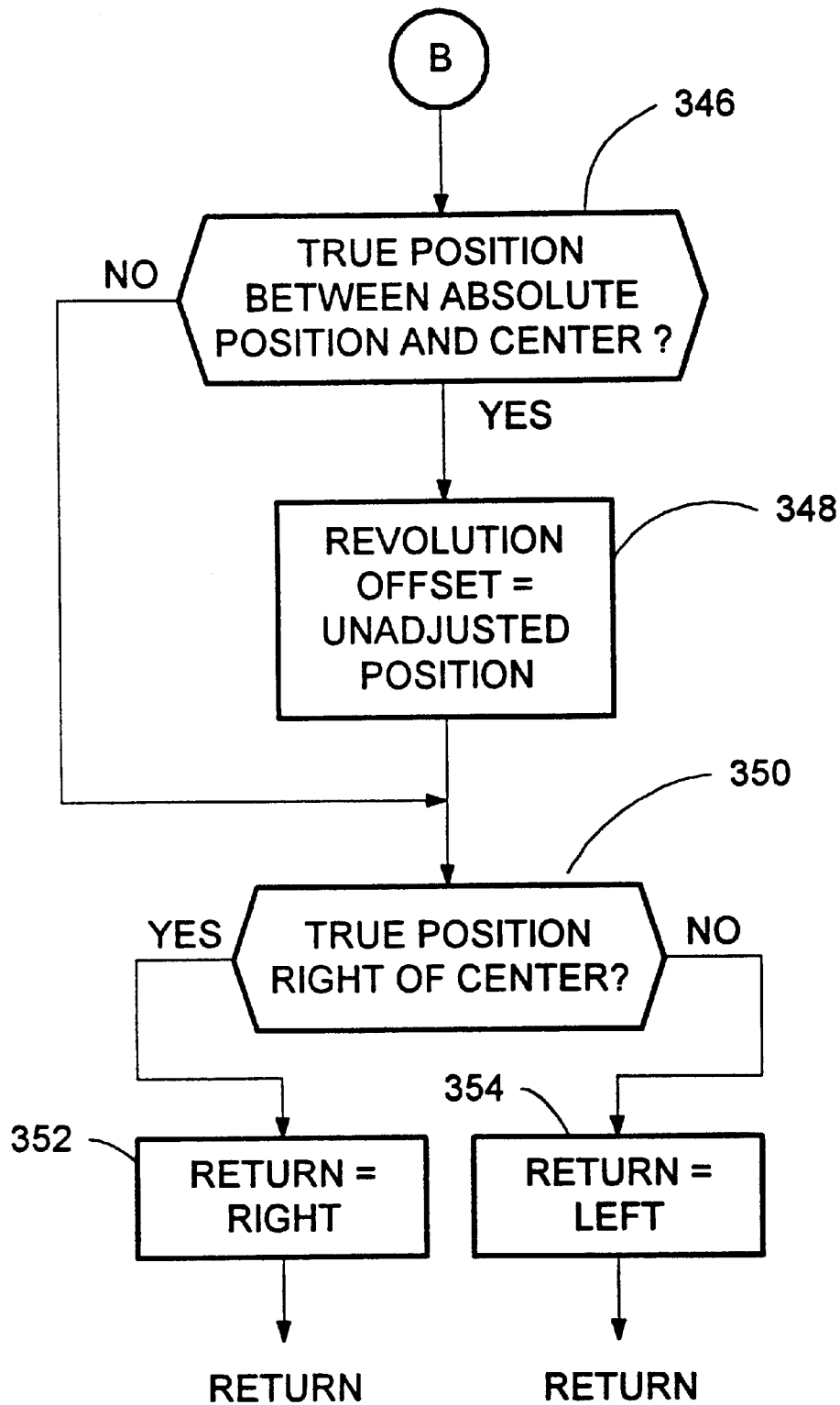

An alternative subroutine WALK is shown in FIGS. 11A and 11B. This version of WALK provides an additional way to shorten the time required for the walk. Steps 330–342 are identical with the similarly numbered steps 130–142 in FIG. 7. But even if the first and second conditions have not ended the walk, there is still a possibility that the walk can be shortened. If the vehicle handwheel has been turned in the direction of center faster than the walk has proceeded, the True Position might be closer to center than the Absolute Position and on the same side. With reference to FIG. 8, the Absolute Position is in the range of dashed line 160*d*. Since the final steps 350–354 of this subroutine will not authorize return torque in this area, no return torque will be provided; and operation will actually be along line 160*b*. But zero Return Torque will be provided for any value of Revolution Offset as it moves to the left until it passes the value of Absolute Position. Therefore, under these circumstances Revolution Offset may be jumped immediately to the present value of Absolute Position, which will be closer to the Target value, without introducing any sudden increase in return torque. The Absolute Position is calculated at 344. At 346 (FIG. 11B), the subroutine determines if True Position is between Absolute Position and center. This can be accomplished by comparing the sign of Absolute Position with the sign of True Position. If the signs are opposite, then True Position is between Absolute Position and center, and Revolution Offset is set equal to Absolute Position at 348. If their signs are the same, then True Position is not between Absolute Position and center, and the subroutine does not change Revolution Offset. The subroutine then proceeds to the group of steps 350–354, which determine whether left or right return is enabled, in a manner identical to steps 144–148 of FIG. 7.

Figure 9:
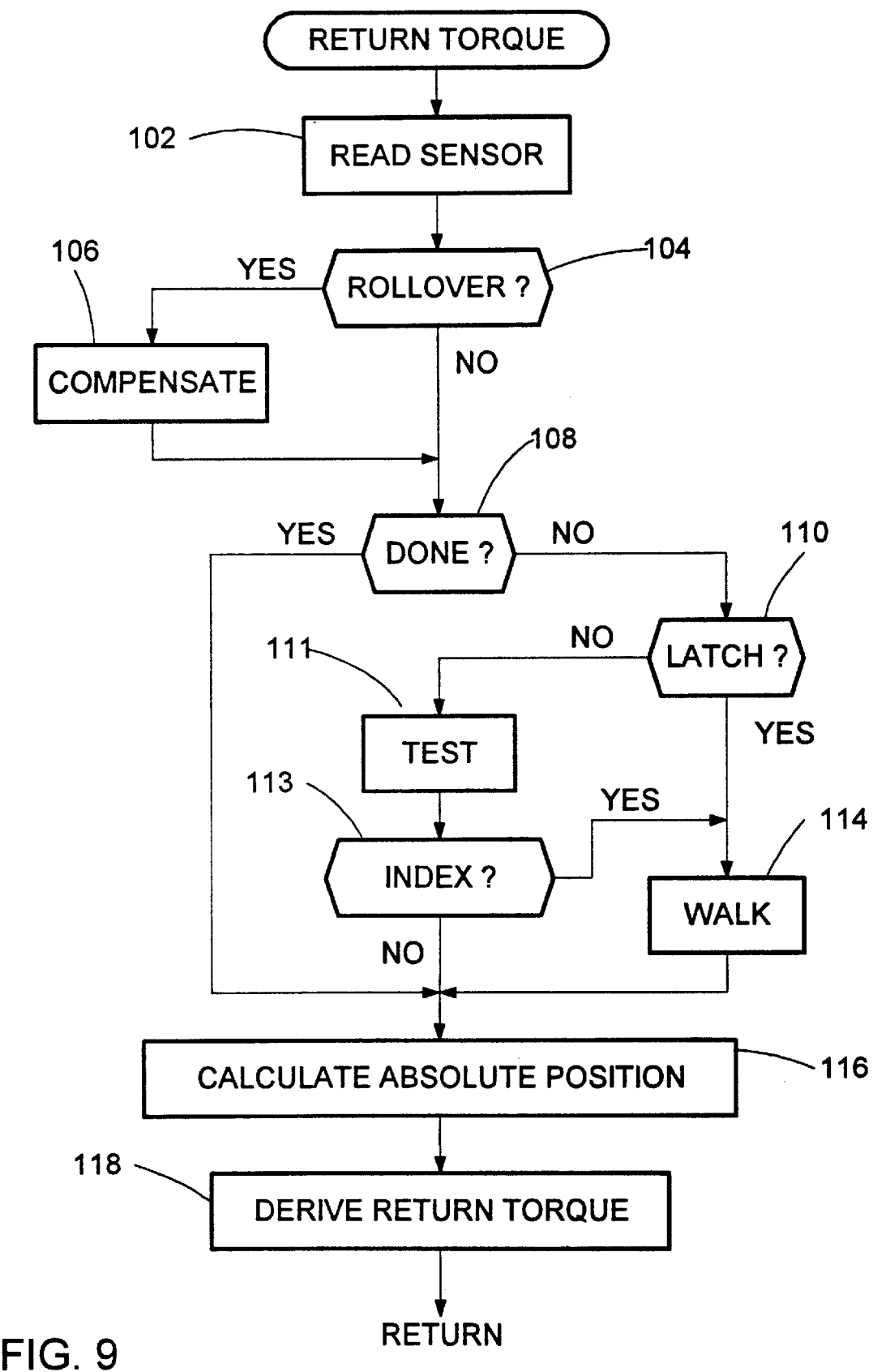
FIG. 9 shows a flow chart of a variation of routine RETURN TORQUE comprising part of another embodiment of the method and apparatus of this invention.
Figure 10:
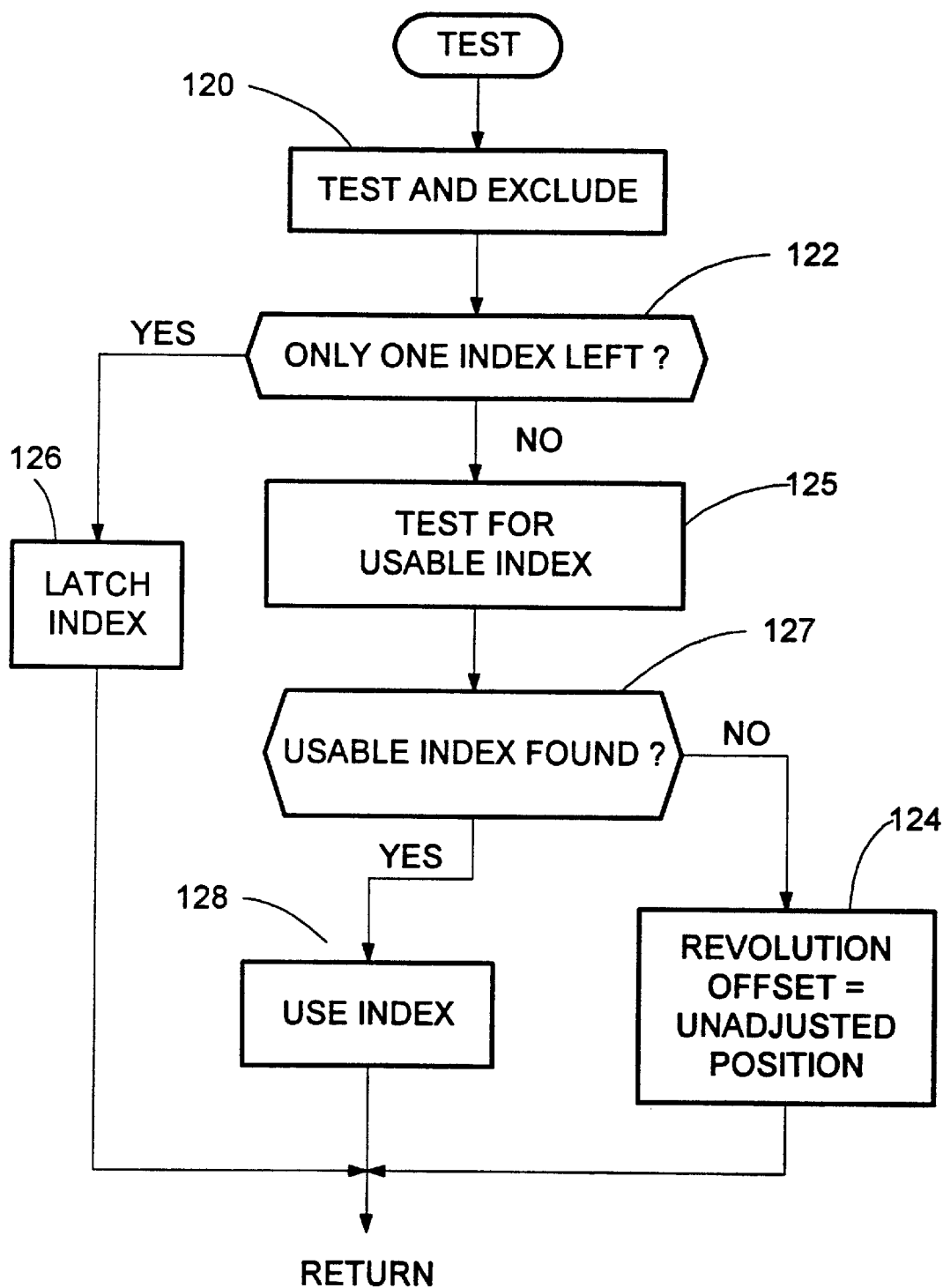
FIG. 10 shows a flow chart of a variation of subroutine TEST comprising part of another embodiment of the method and apparatus of this invention.

A variation of routine RETURN TORQUE is shown in FIG. 9, which also includes a variation of the TEST subroutine in FIG. 10. This version is appropriate for an embodiment of the power steering system in which, due to other reliable information, Return Torque is authorized before the Revolution Offset is latched. The routine of FIG. 9 is identical with that of FIG. 5 in steps 102 through 110 and steps 114 through 118. However, it differs in the procedure followed if the LATCH flag is not found set at 110. In this case, a TEST subroutine is performed that is shown in FIG. 10, to be described below.

Figure 6:
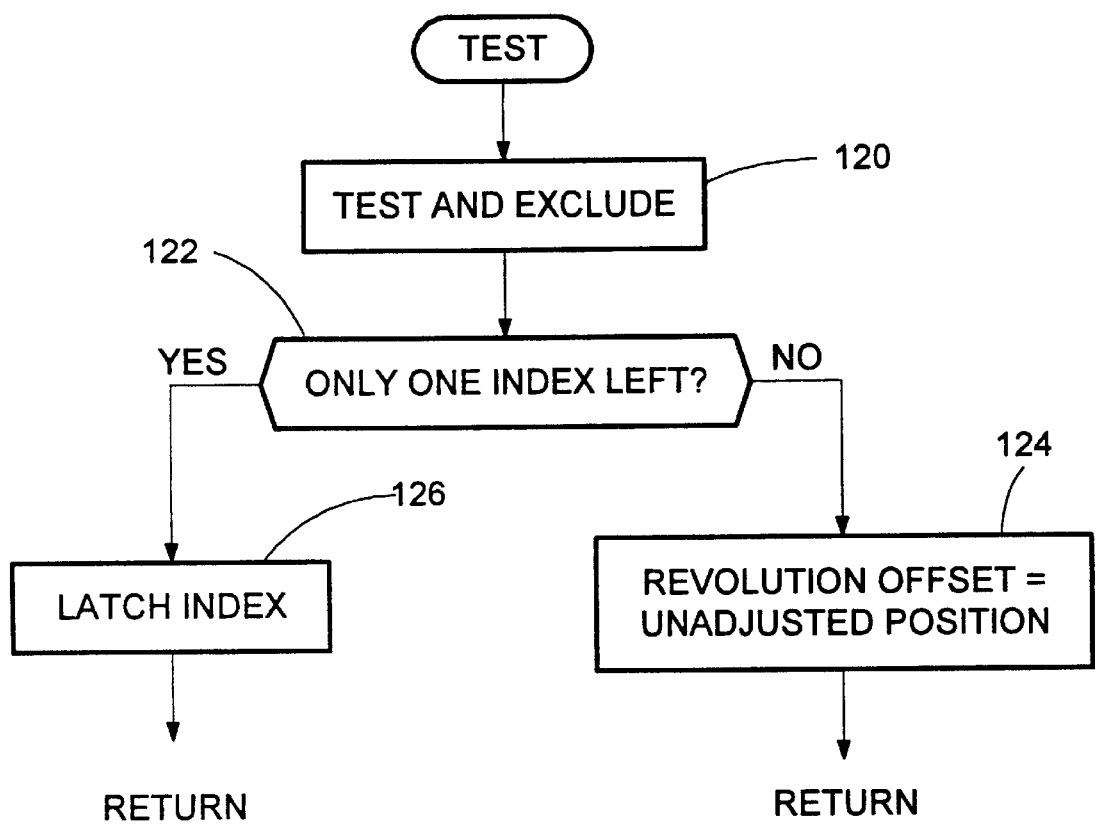
FIG. 6 shows a flow chart of a subroutine TEST comprising part of an embodiment of the method and apparatus of this invention.

Referring to FIG. 10, steps 120 and 122 are identical to those of FIG. 6. From step 122, if there is only one Index left, the LATCH flag is set at 126; and subroutine TEST is exited back to routine RETURN TORQUE. This outcome provides the true value of Revolution Offset and initiates a walk as previously described. From step 122 if there is more than one Index left, the subroutine seeks a usable Index at 125. This can be through a different test procedure not described herein, and may or may not be restricted to the remaining Indexes of step 120. If a usable Index is found at 127, it is set as the walk target at 128 before the subroutine is exited. Return Torque is authorized, but no Index is latched. If no usable Revolution Offset is found, Revolution Offset is set equal to Unadjusted Position at 126 before subroutine TEST is exited. Returning to FIG. 9, after the return from subroutine TEST, it is determined at 113 whether an Index is set or latched. If either is the case, the WALK routine described earlier is called at 114 before Absolute Position is calculated at 116. If not, the routine proceeds directly to step 116.

The embodiment of FIGS. 9, 10 and 7 produces the same result as that of FIGS. 5, 6 and 7 before in initial operation, with no Index used and no Return Torque authorized while testing, and after an Index is latched, with Return Torque authorized in a correct return direction and testing stopped while the Revolution Offset is walked to the value determined by the latched Index. But it offers a third, intermediate mode of operation in which a usable Index may be found by an alternate test or other method and used, with Return Torque authorized in the correct return direction while walking Revolution Offset toward a value determined by the usable Index while testing is continued. If an Index is finally latched which is different from the Index being used, the target Revolution Offset is changed and the walk continues. This permits the use of another test procedure which provides a usable Revolution Offset sooner in some driving modes with a final determination provided by the tests of step 122.

What is claimed is:

1. Method for producing a desired return torque in a vehicle power steering system having a steering position varying through a total range about a center position, the vehicle power steering system having a steering shaft with an actuator coupled thereto for the provision of return torque and a rotational position sensor providing an output signal varying between a minimum value and a maximum value with consecutive rotations of the steering shaft through a rollover angle, whereby rollover transitions are generated between such consecutive rotations, the total range of the steering position being greater than a single rollover angle so that each output of the rotational position sensor indicates a plurality of potential steering positions separated from each other by integer multiples of the rollover angle, the method comprising:

upon initiation of vehicle operation, initially choosing an unadjusted steering position from the plurality of potential steering positions corresponding to a sensed initial output of the rotational position sensor;

repeatedly updating the unadjusted steering position in response to output changes of the rotational position sensor, including sensed rollover transitions, so that the unadjusted steering position varies continuously over the total range of the steering position;

starting with a predetermined set of revolution offsets differing by integer multiples of the rollover angle, repeatedly testing the unadjusted steering position as it is updated to determine which of the revolution offsets in combination with the unadjusted steering position provide potential steering positions which are outside the total range of steering position and excluding those revolution offsets so determined;

while at least two revolution offsets remain unexcluded, deriving a first return torque command and providing the first return torque command to the actuator to produce a first return torque;

after only one final revolution offset remains unexcluded, deriving an absolute steering position from the one final revolution offset in combination with the unadjusted steering position, deriving a second return torque command from the derived absolute steering position and providing the second return torque command to the actuator to produce a second return torque.

2. The method of claim 1 in which the first return torque command is derived from a temporary revolution offset in combination with the updated unadjusted position to produce zero return torque.

3. The method of claim 2 in which, when only one final revolution offset remains unexcluded, the temporary revolution offset is changed in incremental steps toward the one final revolution offset with the first return torque command continuing to be derived from the temporary revolution offset so changed in combination with the updated unadjusted position but provided to the actuator only when producing a return torque in a correct direction.

4. The method of claim 3 in which, while the temporary revolution offset is in use, use of the first torque command is allowed in only a single direction chosen to provide centering of the power steering system as determined in response to a true steering position, derived from the one final revolution offset and the updated unadjusted steering position.

5. The method of claim 3 in which the change of the temporary revolution offset toward the one remaining revolution offset and the provision of the first return torque command are ended when the temporary revolution offset arrives within a first predetermined small distance of the one final revolution offset.

6. The method of claim 3 in which the change of the temporary revolution offset toward the one remaining revolution offset and the provision of the first return torque command are ended when a true steering position, derived from the one final revolution offset in combination with the updated unadjusted position, arrives within a second predetermined small distance of the center position.

7. The method of claim 3 in which the change of the temporary revolution offset toward the one remaining revolution offset and the provision of the first return torque command are ended when a true steering position, derived from the one final revolution offset in combination with the updated unadjusted position, crosses the center position.

8. The method of claim 1 in which the first return torque command is derived from a temporary revolution offset in combination with the updated unadjusted position to produce the first return torque and, when only one final revolution offset remains unexcluded, the temporary revolution offset is changed in incremental steps toward the one final revolution offset with the first return torque command continuing to be derived from the temporary revolution offset so changed in combination with the updated unadjusted position and provided to the actuator only when producing a return torque in a correct direction.

9. The method of claim 8 in which, while the temporary revolution offset is in use, use of the first torque command is allowed in only a single direction chosen to provide centering of the power steering system as determined in response to a true steering position, derived from the one final revolution offset and the updated unadjusted steering position.

10. The method of claim 8 in which the change of the temporary revolution offset toward the one remaining revolution offset and the provision of the first return torque command are ended when the temporary revolution offset arrives within a first predetermined small distance of the one final revolution offset.

11. The method of claim 8 in which the change of the temporary revolution offset toward the one remaining revolution offset and the provision of the first return torque command are ended when a true steering position, derived from the one final revolution offset in combination with the updated unadjusted position, arrives within a second predetermined small distance of the center position.

12. The method of claim 8 in which the change of the temporary revolution offset toward the one remaining revolution offset and the provision of the first return torque command are ended when a true steering position, derived from the one final revolution offset in combination with the updated unadjusted position, crosses the center position.

13. The method of claim 1 in which the first return torque command is derived from a temporary revolution offset in combination with the updated unadjusted position to produce the first return torque and, while at least two revolution offsets remain unexcluded, a usable revolution offset from the predetermined set of revolution offsets is set as a target and the temporary revolution offset is changed in incremental steps toward the usable revolution offset with the first return torque command continuing to be derived from the temporary revolution offset so changed in combination with the updated unadjusted position and provided to the actuator only when producing a return torque in a correct direction.

14. A vehicle power steering system comprising, in combination:

a rotational steering member controlling the attitudinal direction of a vehicle steering wheel through steering apparatus having a steering position varying through a total range about a center position;

an actuator coupled to the rotational steering member for the provision of return torque;

a rotational position sensor providing an output signal varying between a minimum value and a maximum value with consecutive rotations of the steering shaft through a rollover angle, whereby rollover transitions are generated between such consecutive rotations, the total range of the steering position being greater than a single rollover angle so that each output of the rotational position sensor indicates a plurality of potential steering positions separated from each other by integer multiples of the rollover angle;

first means effective upon initiation of vehicle operation for initially choosing an unadjusted steering position from the plurality of absolute steering positions corresponding to a sensed initial output of the rotational position sensor;

second means for repeatedly updating the unadjusted steering position in response to output changes of the rotational position sensor, including sensed rollover transitions;

third means for repeatedly testing the unadjusted steering position as it is updated, starting with a predetermined set of revolution offsets, to determine which of the revolution offsets in combination with the updated unadjusted steering position provide potential steering positions which are outside the total range of steering position and excluding those revolution offsets so determined;

fourth means effective while at least two revolution offsets remain unexcluded for deriving a first return torque command and providing the first return torque command to the actuator to produce a predetermined first return torque; and fifth means effective after only one final revolution offset remains unexcluded for deriving an absolute steering position from the one final revolution offset in combination with the updated unadjusted steering position, deriving a second return torque command from the derived absolute steering position and providing the second return torque command to the actuator to produce a second return torque.

15. The power steering system of claim 14 in which the fourth means derives the first return torque command from a temporary revolution offset in combination with the updated unadjusted position to produce zero return torque.

16. The power steering system of claim 14 in which the fourth means derives the first return torque command from a temporary revolution offset in combination with the updated unadjusted position and is effective when only one revolution offset remains unexcluded to change the temporary revolution offset in incremental steps toward the one final revolution offset while continuing to derive the first return torque command from the temporary revolution offset so changed in combination with the updated unadjusted position and provide the first return torque command to the actuator when it produces a return torque in a correct direction.

17. The power steering system of claim 16 in which the fourth means ceases providing the first return torque command to the actuator when the temporary revolution offset arrives within a first predetermined small distance of the one final revolution offset and the fifth means thereafter provides the second return torque command to the actuator.

18. The power steering system of claim 16 in which the fourth means ceases providing the first return torque command to the actuator when a true steering position, derived from the one final revolution offset in combination with the updated unadjusted position, arrives within a second predetermined small distance of the center position, and the fifth means thereafter provides the second return torque command to the actuator.

19. The power steering system of claim 16 in which the fourth means ceases providing the first return torque command to the actuator when a true steering position, derived from the one final revolution offset in combination with the updated unadjusted position, crosses the center position, and the fifth means thereafter provides the second return torque command to the actuator.

* * * * *